United States Patent
Pennington

(10) Patent No.: US 6,595,332 B1
(45) Date of Patent: Jul. 22, 2003

(54) BRAKE

(76) Inventor: Lance Pennington, 24 Center St., Pine Bush, NY (US) 12566

( * ) Notice: Subject to any disclaimer, the term of this patent is extended or adjusted under 35 U.S.C. 154(b) by 0 days.

(21) Appl. No.: 09/956,352

(22) Filed: Sep. 20, 2001

(51) Int. Cl.$^7$ .............................................. B60T 1/00
(52) U.S. Cl. ............................ 188/31; 188/40; 188/60; 312/201
(58) Field of Search .............................. 188/2 R, 5, 21, 188/23, 31, 32, 40, 60, 82–84, 265; 192/44, 45, 47, 79, 20; 312/201, 202, 198; 74/411.5

(56) References Cited

U.S. PATENT DOCUMENTS 4,607,896 A  *  8/1986  Peterman ..................... 312/201
5,417,486 A  *  5/1995  Manlove ...................... 104/257

* cited by examiner

*Primary Examiner*—Jack Lavinder
*Assistant Examiner*—Benjamin A. Pezzlo

(57) ABSTRACT

A brake for retaining a mobile carriage on which storage facilities are constructed and having a slidable actuating assembly with a claw which engages a slotted member when the actuating assembly is depressed. The mobile carriage is mounted on a platform with a track in which the mobile carriage rolls and with a channel in which the slotted member is secured. A back plate is used to mount the brake on the mobile carriage. A cover is mounted on the back plate and an actuating assembly extends through and is slidably mounted in the pair of openings in the cover so that the actuating assembly may move to and from the platform.

15 Claims, 3 Drawing Sheets

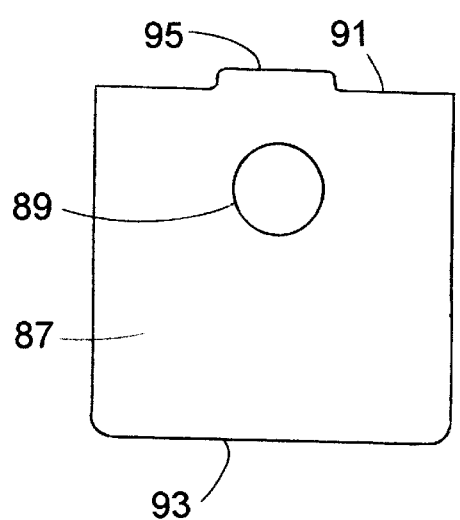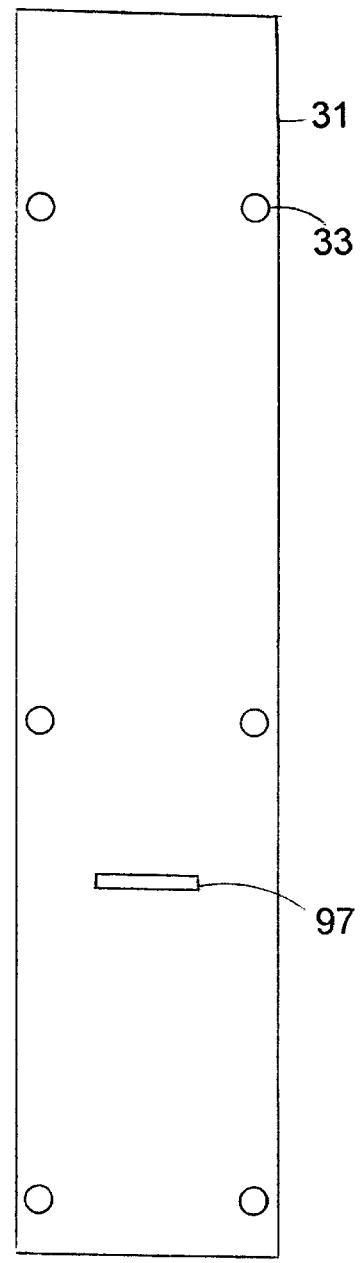
FIGURE 3
FIGURE 4

BRAKE

BACKGROUND OF THE INVENTION

1. Field of the Invention

This invention relates to a brake and more particularly to a brake to retain in a fixed position a moveable carriage on which storage facilities are mounted.

2. Prior Art and Objects

In order to most efficiently use storage space, it has been a known practice to construct storage facilities including shelving and cabinets on a moveable carriage. This is extremely important as far more storage facilities can be placed in available space. The storage facilities are moved apart so as to be able to reach a specific part or parts of the storage facilities desired while the other parts are pushed together. Some of such storage facilities have been built with a drive wheel that is turned to move the carriage, which drive wheel must be released to be used. However, in many storage facilities such as those used to store merchandise in a large retail store, the storage facilities either free wheel or are at best retained by a foot actuated friction pad that engages the floor. This is a matter of economy and the need for ease of relocation of storage facilities.

An undesirable result from movable storage facilities is the possibility that someone will be trapped between the shelving. Friction brakes only partially retard movement and after being forced across the floor several times become worn and reduced in retaining capacity. Someone desiring to enter between two moveable storage facilities may force other storage facilities together not realizing that another person is working between the storage facilities. Someone between the shelves may accidently force the storage facility to move also resulting in injury to another who is trapped as a result of such movement of the storage facilities.

Therefore, it is an object of the invention to provide a brake for moveable storage facilities that positively secures the storage facility in a fixed location.

It is a further object of the invention to provide a brake for mobile storage facilities that is easy to use.

It is still another object of the present invention to provide a brake that is durable and economical to construct.

These and other objects will be apparent to those skilled ion the art based upon the description of the preferred embodiment.

SUMMARY OF THE INVENTION

A brake is provided for use on the carriage of a mobile storage facility. The brake is mounted on the side of the carriage. Outside the track on which the carriage moves a channel is formed. A slotted member, such as a chain, is placed in the channel. A back plate is used to secure the brake to the carriage. A cover is mounted on the back plate, the cover having a U-shape with the two sides of the U-shape being mounted generally horizontally on the back plate which is mounted vertically. As a result the center member of the cover is generally parallel to the back plate. Openings are located in line with one another in the two sides of the cover. A rod is mounted to slide in the openings. The rod extends above the cover. The section of the rod above the cover includes grooves which are generally equally spaced along that section of the rod. A foot plate is secured to the rod at its upper end. The rod extends outside the cover a short distance and a base plate is mounted on the lower end of the rod. The base plate extends forward of the rod. A claw is mounted on the front of the base plate and extends down from the base plate in a generally horizontal position. A spring about the rod and within the cover forces the rod up. By stepping on the foot plate the rod is forced down and the claw is forced into the slotted member thereby forming a positive physical lock preventing any movement of the carriage. A release plate is mounted about the rod and just above the cover. The release plate engages the grooves in the rod holding the rod down against the force of the spring within the cover. A brake spring between the cover and the release plate forces the release plate upwardly. When stepped on, the release plate leaves the grooves in the rod and the main spring forces the rod upwardly thereby releasing the claw from the slotted member.

DESCRIPTION OF THE DRAWINGS

FIG. 1*a* is a perspective view of the cover.

FIG. 3 is a plan view of the release plate showing the tongue on the inside edge of the release plate.

FIG. 4 is a front elevation of the back plate with the slot in it which is engaged by the tongue on the release plate.

| DESCRIPTION OF THE NUMERALS | |
|---|---|
| NUMERAL | DESCRIPTION |
| 11 | Carriage |
| 13 | Base of carriage |
| 15 | Horizontal foundation - carriage |
| 17 | Vertical side member |
| 19 | Platform |
| 21 | Floor |
| 23 | Track in platform |
| 25 | Wheel of carriage |
| 27 | Channel in platform |
| 29 | Slotted member |
| 31 | Back plate |
| 33 | Bolt holes |
| 35 | Upper end - back plate |
| 37 | Lower end - back plate |
| 39 | Bolts |
| 41 | Cover |
| 43 | Two end plates - cover |
| 45 | Face plate - cover |
| 47 | Lower end plate |
| 49 | Upper end plate |
| 51 | Opening - upper end plate |
| 53 | Opening - lower end plate |
| 55 | Actuating Assembly |
| 57 | Upper end - actuating assembly |
| 59 | Lower end - actuating assembly |
| 61 | Foot plate |
| 63 | Rod |
| 65 | Sleeve |
| 67 | Upper end - sleeve |
| 69 | Lower end - sleeve |
| 71 | Pin |
| 73 | Main spring |
| 75 | Base plate |
| 77 | Front edge - base plate |
| 79 | Claw |
| 81 | Plurality of fingers |
| 83 | Two center fingers |
| 85 | Two side fingers |
| 87 | Release plate |

-continued

DESCRIPTION OF THE NUMERALS

| NUMERAL | DESCRIPTION |
| --- | --- |
| 89 | Opening - release plate |
| 91 | Inside edge - release plate |
| 93 | Outside edge - release plate |
| 95 | Tongue |
| 97 | Slot |
| 99 | Grooves |
| 101 | Release spring |

DETAILED DESCRIPTION OF THE PREFERRED EMBODIMENT

Figure 1:
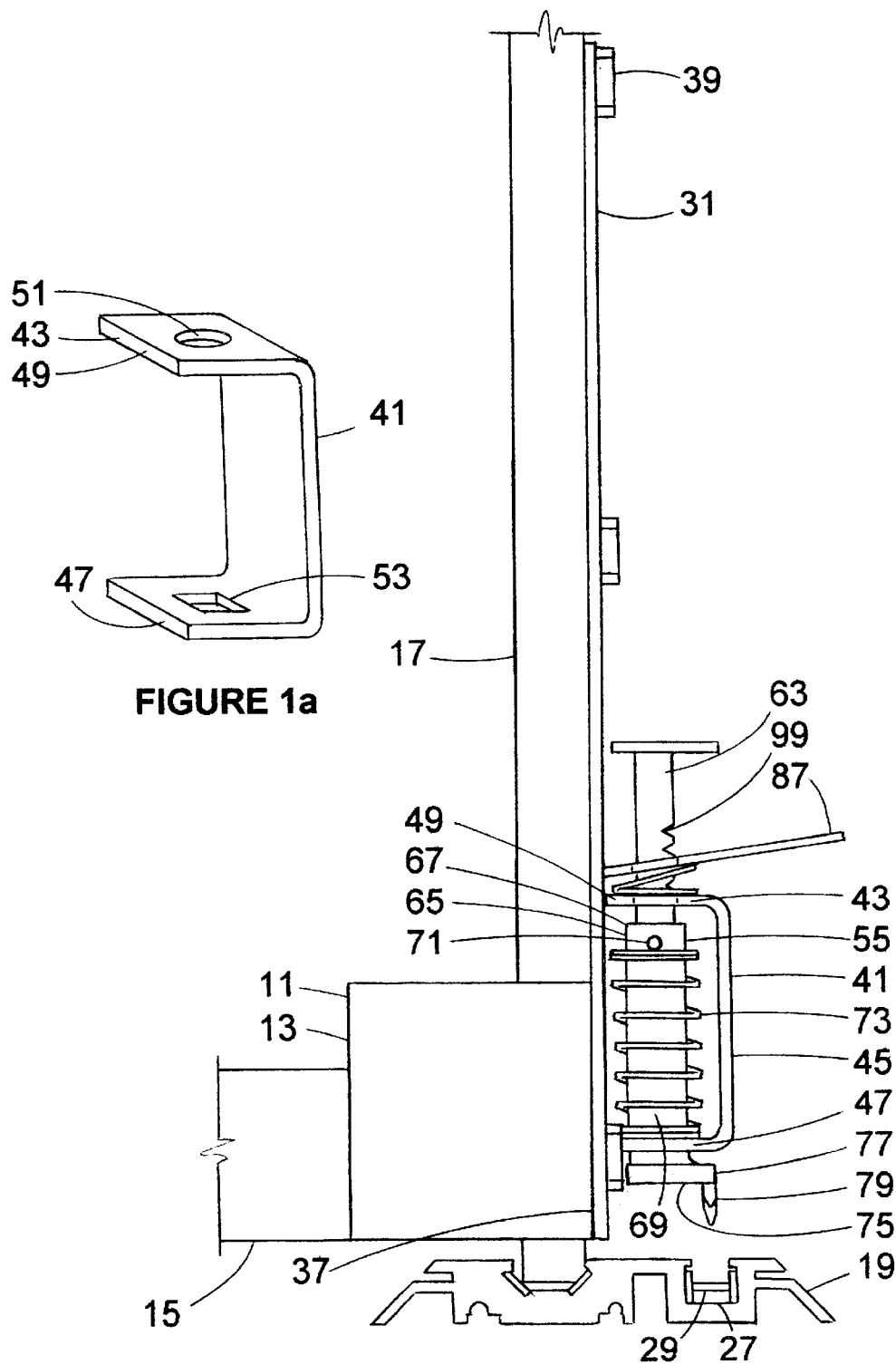
FIG. 1 is a side elevation of the brake on a carriage showing and end view of the platform on which the carriage is mounted.
Figure 2:
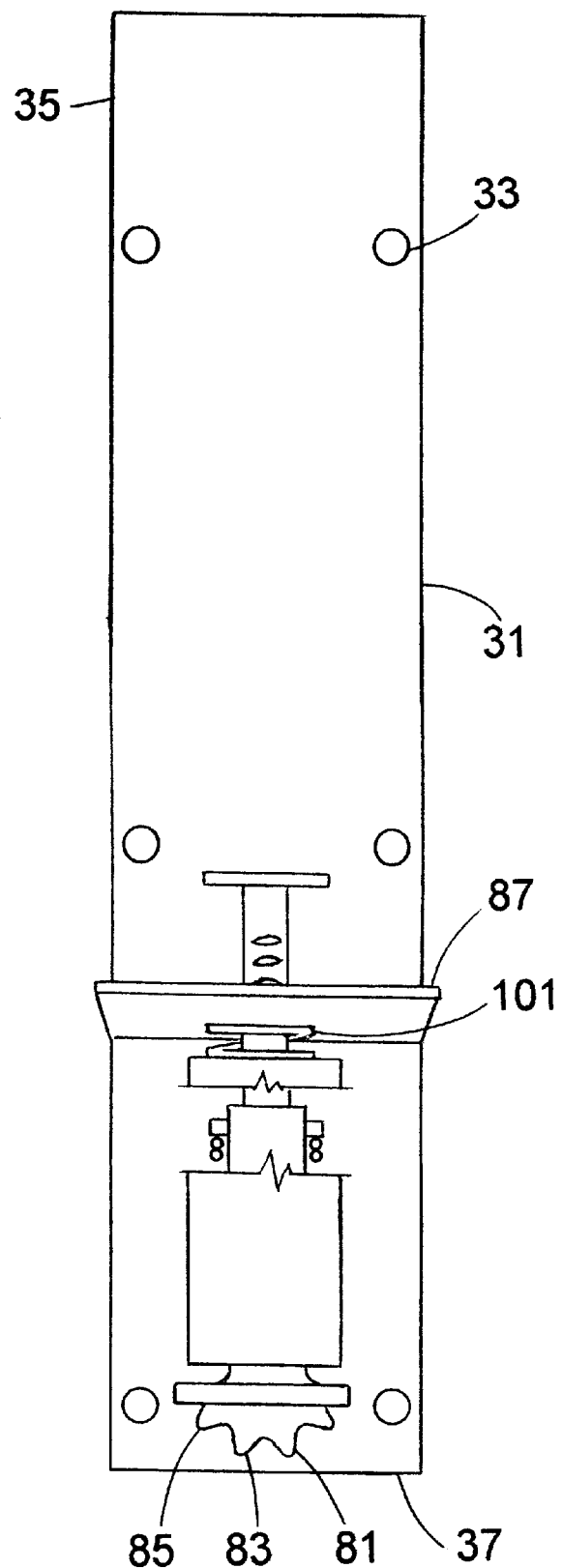
FIG. 2 is a front elevation of the brake on the side of a carriage showing the claw and with a portion of the cover broken away to show the pin through the sleeve and the rod.

As best seen in FIGS. 1 and 2, a carriage 11, which is mobile, on which storage facilities (not shown) are mounted is shown. The brake in accordance with this invention is shown affixed to the side of the carriage 11 at the base 13 of the carriage 11. The carriage 11 includes a horizontal foundation 15 and a vertical side member 17. Various types of storage facilities, such as shelving (not shown) are mounted above and within the carriage 11.

As best seen in FIG. 1, a platform 19 is placed on the floor 21 where the carriage 11 is located. The platform 19 includes a track 23 into which a wheel 25 on the carriage 13 sets to permit movement of the carriage 11 while directing the path of movement of the carriage 11. The platform 19, which extends beyond the carriage 11, also includes a channel 27 which is located outside the carriage 11. A slotted member 29 is placed in the channel 27. A chain provides a suitable slotted member 29 but other forms of slotted members 29 could also be used.

The back plate 31 serves to support the brake and is used to mount the brake on the carriage 11. The back plate 31 a plurality of bolt holes 33 located in the back plate 33 at the upper end 35 and at the lower end 37 as well as in between the upper end 35 and the lower end 37, generally in the middle of the back plate 31. Bolts 39 are placed through the bolt holes 33 and are secured onto the carriage 11.

A cover 41, having a U-shape, is mounted on the back plate 31 toward the lower end 37 of the back plate 31. The cover 41 has two end plates 43 and a face plate 45. The cover 41 is mounted on the back plate 31 with the face plate 45 generally parallel to the back plate 31 and with the two side end plates 43 secured to the back plate 31. One end plate 43, the lower end plate 47, is located toward the lower end 37 of the back plate 31 and the other end plate 43, the upper end plate 49 is located at the opposite end of the cover 41. The two end plates 43 are substantially parallel to one another. As seen in FIG. 1a, an opening 51 is formed in the upper end plate 49 and another opening 53, which is aligned with the opening 51 in the upper end plate 49 is formed in the lower end plate 47.

An actuating assembly 55 is slidably mounted in the two openings 51,53 in the end plates 43. The actuating assembly 55, which has an upper end 57 and a lower end 59, extends above the cover 41 and has a foot plate 61 mounted on it at the upper end 57. The actuating assembly 55 is slidably mounted in the openings 53 in the lower end plate 47 and the opening 51 in the upper plate 49. The actuating assembly 55 includes a rod 63 and a sleeve 65 which is secured to the rod 61 and is mounted over the rod. The sleeve 65, which is rectangular in cross section but with rounded corners, has an upper end 67 and a lower end 69. The upper end 67 is located beneath the upper end plate 49 and inside the cover 41. A pin 71 extends through the sleeve 65 adjacent to the upper end 67 of the sleeve 65 and through the rod 63. The pin 71 extends beyond the sleeve 65 on both sides of the sleeve 65. A main spring 73, which is a coil spring, is mounted about the sleeve 65 and is held between the lower end plate 47 and the pin 71. Since the pin 71 extends beyond the sleeve 65 at both ends, the pin 71 provides a stop for the main spring 73. The sleeve 65 is mounted to slide in the opening 53 in the lower end plate 47 and the rod 63 is mounted to slide in the opening 51 in the upper end plate 49.

At the lower end 69 of the sleeve 65, a base plate 75 is secured to the sleeve 65. The base plate 75, which is generally at right angles to the actuating assembly 55 and is generally parallel to the two end plates 43, extends beyond the sleeve 65 away from the back plate 31. It is essential that the base plate 75 extend away from the back plate 31 so as to have a front edge 77 approximately in line with the face plate 45. At the front edge 77, a claw 79 is mounted on the base plate 75. The claw 79 is generally at right angles to the base plate 75 and extends away from the cover 41 toward the platform 19. The claw 79 includes a plurality of fingers 81, preferably four fingers with two center fingers 83 and two side fingers 85 at an acute angle to the two center fingers 83. The fingers 81 are designed to engage the slotted member 29 in the platform 19 and the configuration of the fingers 81 depends upon the specific design of the slotted member 29 as the claw 79 and the slotted member 29 must mesh. The claw 79, illustrated in FIG. 2, is designed to engage the chain shown in FIG. 1.

A release plate 87 is located above the upper end plate 49. The release plate 87, which is essentially rectangular, has an opening 89 in it and fits on the rod 63 with the rod 63 extending through the opening 89. The release plate 87 has an inside edge 91 that engages the back plate 31 and an outside edge 93 that extends beyond the cover 41. As best seen in FIG. 3, the release plate 87, on its inside edge 91, has a tongue 95 on it. A slot 97, as shown in FIG. 4, is located in the release plate 31 and the tongue 95 on the release plate 87 is inserted into the slot 97 in the back plate 31. As a result, the outside edge 93 of the release plate 89 may move up and down, away from and toward the upper end plate 49. The release plate 87 is situated at an acute angle from the upper end plate 49 and the outside edge 93 is usually slightly higher than the inside edge 91. The actuating assembly 55 is pushed down against the force of the main spring 73 to cause the actuating assembly 55 to move downwardly and, as a result, the claw 79 engages the slotted member 29. The rod 63 has grooves 99 which are generally equally spaced and which face away from the back plate 31. To hold the actuating assembly 55 down, the opening 89 in the release plate 87 engages one of the grooves 99 in the rod 63 and holds the rod 63 and the entire actuating assembly 55 in its depressed position against the force of the main spring 73. By stepping on the release plate 87, generally at the outside edge 93, the release plate 87 pivots toward the upper end plate 49 and the groove 99 in the rod 63 is disengaged from the release plate 87 and the main spring 73 forces the actuating assembly 55 upwardly lifting the claw 79 from the slotted member 29. A release spring 101 is located between the upper end plate 49 and the release plate 87 which forces the release plate 87 upwardly at an angle, as previously described, away from the upper end plate 49.

During experimental testing of the brake, it was determined that both the rod 63 and the release plate 87 needed to be formed from hardened steel in order for the brake to have a long and dependable life. Specifically, the rod 63 and the release plate 87 had to be case hardened two thousand to three thousand.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A brake for use on a mobile carriage on which storage facilities are constructed, the mobile carriage being mounted on a platform with a track in which the mobile carriage rolls and with a channel in which a slotted member is secured, the brake comprising:

a back plate for mounting the brake on the mobile carriage;

a cover mounted on the back plate, the cover having a pair of openings through it which are aligned with one another;

an actuating assembly extending through and slidably mounted in the pair of openings in the cover to move to and from the platform;

a claw mounted on the actuating assembly to engage the slotted member when the actuating assembly is moved toward the platform;

a coil spring located within the cover to force the actuating assembly away from the slotted member; and a release plate having an inside edge mounted on the back plate above the cover and having an outside edge that moves up away from the cover and down toward the cover to retain the actuating assembly against the force of the coil spring and to release the actuating assembly to remove the claw from the slotted member.

2. A brake according to claim 1 wherein the cover is U-shaped having a face plate, a lower end plate and an upper end plate, the end plate and the upper end plate being substantially parallel to one another and being affixed to the back plate.

3. A brake according to claim 1 wherein the actuating assembly includes a rod and a sleeve, the sleeve being affixed to the rod and extending from within the cover toward the platform and the rod extending from within the cover away from the platform.

4. A brake according to claim 1 wherein the claw includes a plurality of fingers.

5. A brake according to claim 1 wherein the claw includes two center fingers and two side fingers located on each side of the two center fingers, the two fingers being at an acute angle to the two center fingers.

6. A brake according to claim 1 wherein the actuating assembly includes a sleeve mounted on a rod.

7. A brake according to claim 1 wherein the actuating assembly includes a rod and the rod and the release plate are hardened steel.

8. A brake for use on a mobile carriage on which storage facilities are constructed, the mobile carriage being mounted on a platform with a track in which the mobile carriage rolls and with a channel in which a slotted member is secured, the brake comprising:

a back plate mounted generally vertically on the mobile carriage adjacent the platform;

a cover mounted on the back plate, the cover including an upper end plate, a lower end plate and a face plate, the upper end plate having an opening in it and the lower end plate having an opening in it, the opening in the upper end plate and the opening in the lower end plate being aligned with one another;

a rod having an upper end and a lower end slidably mounted in the opening in the upper end plate, the upper end of the rod extending above the upper end plate and having grooves generally equally spaced in it between the upper end plate and the upper end of the rod, the grooves on the rod facing away from the back plate, the rod further having a foot plate mounted on the upper end of the rod;

a sleeve having an upper end and a lower end secured to the lower end of the rod, the sleeve slidably mounted in the opening in the lower end plate;

a base plate with a front edge mounted on the lower end of the sleeve and extending from the sleeve away from the back plate to the front edge;

a claw secured to the base plate at the front edge and extending downwardly from the base plate away from the cover generally at right angles to the base plate and aligned with the slotted member;

means to force the rod and the sleeve away from the slotted member; the rod and the sleeve being slidable against the means to force the rod and the sleeve away from the slotted member when force is applied to the foot plate;

a release plate mounted above the upper end plate and having an inside edge that pivots on the back plate and having an outside edge extending away from the back plate and further having an opening through it, the rod being slidably mounted in the opening in the release plate, the release plate being located at an acute angle to the upper end plate; and means to pivot the release plate away from the upper end plate.

9. A brake according to claim 8 wherein the rod and the release plate are hardened steel.

10. A brake according to claim 8 wherein the means to force the rod and the sleeve away form the slotted member includes a coil spring located within the cover.

11. A brake according to claim 8 wherein the claw includes two center fingers and two side fingers located on each side of the two center fingers, the two fingers being at an acute angle to the two center fingers.

12. A brake according to claim 8 wherein the cover is U-shaped having a face plate, a lower end plate and an upper end plate, the end plate and the upper end plate being substantially parallel to one another and being affixed to the back plate.

13. A brake according to claim 8 wherein the claw includes a plurality of fingers.

14. A brake for use on a mobile carriage on which storage facilities are constructed, the mobile carriage being mounted on a platform with a track in which the mobile carriage rolls and with a channel in which a slotted member is secured, the brake comprising:

a back plate mounted generally vertically on the mobile carriage adjacent the platform;

a cover with a U-shape mounted on the back plate, the cover including an upper end plate, a lower end plate and a face plate, the upper end plate and the lower end plate being generally parallel to one another and the face plate being generally parallel to the back plate, the upper end plate having an opening in it and the lower end plate having an opening in it, the opening in the upper end plate and the opening in the lower end plate being aligned with one another, the opening in the upper end plate being spaced a distance from the back plate;

a rod having an upper end and a lower end extending through the opening in the upper end plate, the upper end of the rod extending above the upper end plate and having grooves generally equally spaced in it between the upper end plate and the upper end of the rod, the grooves on the rod facing away from the back plate, the rod further having a foot plate mounted on the upper end of the rod;

a sleeve having an upper end and a lower end mounted on the lower end of the rod beneath the upper end plate and within the cover, the sleeve having a square cross section, the sleeve extending through the opening in the lower end plate;

a pin extending through the sleeve and the rod adjacent the upper end of the sleeve, the pin extending beyond the sleeve;

a base plate with a front edge mounted on the lower end of the sleeve and extending from the sleeve away from the back plate to the front edge;

a claw including a plurality of fingers secured to the base plate at the front edge and extending downwardly from the base plate away from the cover generally at right angles to the base plate and aligned with the slotted member;

a main spring located about the sleeve and between the lower end plate and the pin to force the sleeve and the rod upwardly away from the platform;

a release plate having an inside edge that engages the back plate and an outside edge extending away from the back plate beyond the cover and further having an opening through it, the opening in the release plate being spaced a distance from the back edge of the release plate, the release plate being mounted above the upper end plate with the rod through the opening in the release plate, the distance from the opening in the release plate being slightly greater than the distance from the opening in the upper end plate to the back plate, the release plate being located at an acute angle to the upper end plate; and a release spring mounted about the rod between the upper end plate and the release plate to force the upper end plate away from the upper end plate.

15. A brake according to claim 14 wherein the rod and the release plate are hardened steel.

* * * * *